(12) United States Patent
Park

(10) Patent No.: US 12,330,497 B2
(45) Date of Patent: Jun. 17, 2025

(54) POWER TRANSMISSION DEVICE

(71) Applicant: Dong-Hoon Park, Seongnam-si (KR)

(72) Inventor: Dong-Hoon Park, Seongnam-si (KR)

(*) Notice: Subject to any disclaimer, the term of this patent is extended or adjusted under 35 U.S.C. 154(b) by 91 days.

(21) Appl. No.: 18/519,319

(22) Filed: Nov. 27, 2023

(65) Prior Publication Data
US 2024/0198791 A1    Jun. 20, 2024

(30) Foreign Application Priority Data

Nov. 28, 2022  (KR) .................. 10-2022-0161266
Nov. 28, 2022  (KR) .................. 10-2022-0161267
Nov. 28, 2022  (KR) .................. 10-2022-0161268
Nov. 27, 2023  (KR) .................. 10-2023-0166283

(51) Int. Cl.
*B60K 17/04*    (2006.01)
*B60K 7/00*     (2006.01)
*B60K 17/14*    (2006.01)
*F16H 1/32*     (2006.01)

(52) U.S. Cl.
CPC .......... *B60K 17/043* (2013.01); *B60K 17/145* (2013.01)

(58) Field of Classification Search
CPC ........ B60K 1/02; B60K 17/046; B60K 17/06; B60K 2007/0038; B60K 2007/0061; B60K 2007/0069; B60K 2007/0076; F16H 1/12–24
See application file for complete search history.

(56) References Cited

U.S. PATENT DOCUMENTS 1,155,123 A * 9/1915 Barton .................... F16H 1/203
                                                    74/420
5,560,442 A * 10/1996 Canderle ................... B62M 7/12
                                                   180/65.6

FOREIGN PATENT DOCUMENTS

CN     107181429          9/2017
GB     2494452 A  *       3/2013   ........... B60K 17/043

* cited by examiner

*Primary Examiner* — Tinh Dang
(74) *Attorney, Agent, or Firm* — LEX IP MEISTER, PLLC

(57) ABSTRACT

The power transmission device includes: a drive motor assembly including a motor housing, a first axial flow motor disposed in a front portion of the motor housing and rotating a first pinion gear in a first rotation direction, and a second axial flow motor disposed in a rear portion of the motor housing and operably coupled to a second pinion gear to rotate the second pinion gear in a second rotation direction opposite to the first rotation direction; a drum surrounding the drive motor assembly by including a drum disk portion disposed on one surface in a wheel axial direction and a cylindrical portion extending from an outer diameter end of the drum disk portion in the wheel axial direction; a drum cover coupled to the other surface of the drum in the wheel axial direction, and having a ring gear disposed on its outer diameter and meshed with the first and second pinion gears; and a wheel hub installed with a tire, and coupled to the drum to be rotated together with the drum, wherein the first and second pinion gears are rotated at the same speed.

13 Claims, 10 Drawing Sheets

POWER TRANSMISSION DEVICE

CROSS-REFERENCE TO RELATED APPLICATION

This application claims priority to and the benefit of Korean Patent Application No. 10-2022-0161266 filed in the Korean Intellectual Property Office on Nov. 28, 2022, Korean Patent Application No. 10-2022-0161267 filed in the Korean Intellectual Property Office on Nov. 28, 2022, Korean Patent Application No. 10-2022-0161268 filed in the Korean Intellectual Property Office on Nov. 28, 2022, and Korean Patent Application No. 10-2023-0166283 filed in the Korean Intellectual Property Office on Nov. 27, 2023, the entire contents of which are incorporated herein by reference.

BACKGROUND OF THE INVENTION

(a) Field of the Invention

The disclosure relates to a power transmission device, and more particularly, to a power transmission device which may be used in a wheel drive unit or the like.

(b) Description of the Related Art

In recent years, the use of an eco-friendly vehicle such as a hybrid vehicle and an electric vehicle is increasing due to tightened environmental regulation and fuel economy regulation. The eco-friendly vehicle may include an electric motor as a power source, and various types of eco-friendly vehicles may be implemented based on dispositions of the electric motor and a reducer.

One of the various disposition methods of the power source for the eco-friendly vehicles may be a method of using a wheel drive unit in which the power source is disposed in or near a wheel hub. A conventional wheel drive unit may have a large size, and a portion of the wheel drive unit may protrude outside the wheel hub. Such a portion of the wheel drive unit that protrudes to the outside the wheel hub may cause interference with a vehicle part such as a suspension or a braking device. Accordingly, a design change in a vehicle body or a chassis may be required to install the conventional wheel drive unit on the vehicle.

An in-wheel motor system has been developed to solve this problem. The in-wheel motor system may be a system in which the electric motor, which is the power source, and the reducer are disposed in the wheel hub. A conventional in-wheel motor system may mainly use a planetary gear set as its reducer. However, it is difficult to dispose the electric motor, the planetary gear set, and a wheel bearing in the wheel hub. Accordingly, an in-wheel motor system including no reducer has been developed.

However, the in-wheel motor system including no reducer may require a large-capacity electric motor because the vehicle is required to be launched and driven at a high speed by power of the electric motor itself. As a result, the in-wheel motor system may consume a lot of power, thus causing a limit to a distance in which the vehicle may be driven on a single charge. The system is required to use a large-capacity battery to compensate for this problem.

Meanwhile, according to conventional technology, one pinion gear included in a reduction device may rotate a ring gear, stress may be concentrated on one pinion gear, thus lowering durability of the reduction device. In addition, a road impact occurring while the vehicle is driven may be also transmitted directly to one pinion gear through the ring gear, thus further lowering the durability of the reduction device.

The above information disclosed in this Background section is provided only to assist in more understanding of the background of the disclosure, and may thus include information not included in the prior art already known to those skilled in the art to which the disclosure pertains.

SUMMARY OF THE INVENTION

The disclosure attempts to provide a power transmission device with a compact structure in which two axial flow motor structures are used to reduce a size of a drive motor assembly and a diameter of a ring gear.

In addition, the disclosure attempts to provide a power transmission device which may transmit a driving force of a drive motor assembly to a ring gear through two pinion gears, thereby reducing stress acting on each pinion gear and improving durability of a reduction device.

In addition, the disclosure attempts to provide a power transmission device in which a road impact is distributed and transmitted to two pinion gears through a ring gear.

According to an aspect, a power transmission device includes: a drive motor assembly including a motor housing, a first axial flow motor disposed in a front portion of the motor housing and rotating a first pinion gear in a first rotation direction, and a second axial flow motor disposed in a rear portion of the motor housing and operably coupled to a second pinion gear to rotate the second pinion gear in a second rotation direction opposite to the first rotation direction; a drum surrounding the drive motor assembly by including a drum disk portion disposed on one surface in a wheel axial direction and a cylindrical portion extending from an outer diameter end of the drum disk portion in the wheel axial direction; a drum cover coupled to the other surface of the drum in the wheel axial direction, and having a ring gear disposed on its outer diameter and meshed with the first and second pinion gears; and a wheel hub installed with a tire, and coupled to the drum to be rotated together with the drum, wherein the first and second pinion gears are rotated at the same speed.

In an embodiment, the first axial flow motor may include: a stator fixed to the front portion of the motor housing and generating a magnetic field; a motor shaft extending along a center line in the axial direction and disposed in the motor housing to be rotatable around the center line; and a rotor protruding radially outward from a center of the motor shaft in the axial direction, disposed at the rear of the stator in the axial direction while having a predetermined gap with the stator to face the stator in the axial direction, and rotated in the first rotation direction by the magnetic field generated by the stator, and the first pinion gear is disposed at a front end of the motor shaft that protrudes forward from the motor housing.

The second axial flow motor may include: a second stator fixed to the rear portion of the motor housing and generating a magnetic field; a motor shaft; and a rotor, the second stator may be disposed at the rear of the rotor in the axial direction while having a predetermined gap with the rotor to face the rotor in the axial direction, the second stator may rotate the rotor in the first rotation direction by the magnetic field generated by the second stator, and a drive gear may be fixedly disposed at a rear end of the motor shaft that protrudes rearward from the motor housing.

The drive motor assembly may further include: a driven shaft disposed to be parallel to the motor shaft; and a driven gear disposed in a front portion of the driven shaft and meshed with the drive gear, and the second pinion gear may be fixedly disposed at a rear end of the driven shaft.

In another embodiment, wherein the first axial flow motor may include: a stator fixed to a center of the motor housing in the axial direction and generating a magnetic field; a motor shaft extending along a center line in the axial direction, and disposed in the motor housing to be rotatable around the center line; and a rotor protruding radially outward from a front portion of the motor shaft in the axial direction, disposed at the front of the stator in the axial direction while having a predetermined gap with the stator to face the stator in the axial direction, and rotated in the first rotation direction by the magnetic field generated by the stator, and the first pinion gear may be disposed at a front end of the motor shaft that protrudes forward from the motor housing.

The second axial flow motor may include: the stator; the motor shaft; and a second rotor protruding radially outward from a rear portion of the motor shaft in the axial direction, disposed at the rear of the stator in the axial direction while having a predetermined gap with the stator to face the stator in the axial direction, and rotated in the first rotation direction by the magnetic field generated by the stator, and a drive gear may be fixedly disposed at a rear end of the motor shaft that protrudes rearward from the motor housing.

The drive motor assembly may further include: a driven shaft disposed to be parallel to the motor shaft; and a driven gear disposed in a front portion of the driven shaft and meshed with the drive gear, and the second pinion gear is fixedly disposed at a rear end of the driven shaft.

In another embodiment, a motor shaft hole may be formed in the front of a rear center of the motor shaft in the axial direction.

The second axial flow motor may include: the stator; a second motor shaft extending along the center line in the axial direction, including a front end extending forward in the axial direction to be inserted into the motor shaft hole to be rotatable, and disposed in the motor housing to be rotatable around the center line; and a second rotor protruding radially outward from the second motor shaft, disposed at the rear of the stator in the axial direction while having a predetermined gap with the stator to face the stator in the axial direction, and rotated in the second rotation direction by the magnetic field generated by the stator, and the second pinion gear may be fixedly disposed at a rear end of the second motor shaft that protrudes rearward from the motor housing.

In another embodiment, the motor housing may further include a center support protruding radially inward from a middle portion of the motor housing, and the first axial flow motor may be disposed at the front of the center support, and the second axial flow motor is disposed at the rear of the center support.

The first axial flow motor may include: a stator fixed to the front portion of the motor housing and generating a magnetic field; a motor shaft extending along a center line in the axial direction, and disposed in the motor housing to be rotatable around the center line; and a rotor protruding radially outward from the motor shaft, disposed at the rear of the stator in the axial direction while having a predetermined gap with the stator to face the stator in the axial direction, and rotated in the first rotation direction by the magnetic field generated by the stator, the first pinion gear may be disposed at a front end of the motor shaft that protrudes forward from the motor housing, and a rear end of the motor shaft may be supported by the center support to be rotatable.

Wherein the second axial flow motor may include: a second stator fixed to the rear portion of the motor housing and generating the magnetic field; a second motor shaft extending along the center line in the axial direction, and disposed in the motor housing to be rotatable around the center line; and a second rotor protruding radially outward from the second motor shaft, disposed at the front of the second stator in the axial direction while having a predetermined gap with the second stator to face the second stator in the axial direction, and rotated in the second rotation direction by the magnetic field generated by the second stator, the second pinion gear may be disposed at a rear end of the second motor shaft that protrudes rearward from the motor housing, and a front end of the second motor shaft may be supported by the center support to be rotatable.

A main coolant jacket may be formed at the center support to cool the rotor and the second rotor, a first sub-coolant jacket may be formed at the stator to cool the stator, and a second sub-coolant jacket may be formed at the second stator to cool the second stator.

According to the disclosure, the two axial flow motor structures may be used to reduce the size of the drive motor assembly and the diameter of the ring gea. It is thus possible to implement the compact structure.

The disclosure may transmit the driving force of the drive motor assembly to the ring gear through the two pinion gears, thereby reducing the stress acting on each pinion gear. It is thus possible to improve the durability of the reduction device.

It is also possible to distribute and transmit the road impact to the two pinion gears through the ring gear. A shock of the road impact may be distributed and transmitted, thus further improving the durability of the reduction device.

In addition, the stress acting on each driving and/or driven pinion gear may be halved, thus making the pinion gears smaller.

Other effects which may be acquired or predicted by the embodiments of the disclosure are disclosed directly or implicitly in the detailed description of the embodiments of the disclosure. That is, various effects predicted based on the embodiments of the disclosure are disclosed in the detailed description described below.

BRIEF DESCRIPTION OF THE DRAWINGS

Embodiments in the specification may be better understood by referring to the following description in connection with the accompanying drawings in which like reference numerals refer to identical or functionally similar elements.

Figure 1:
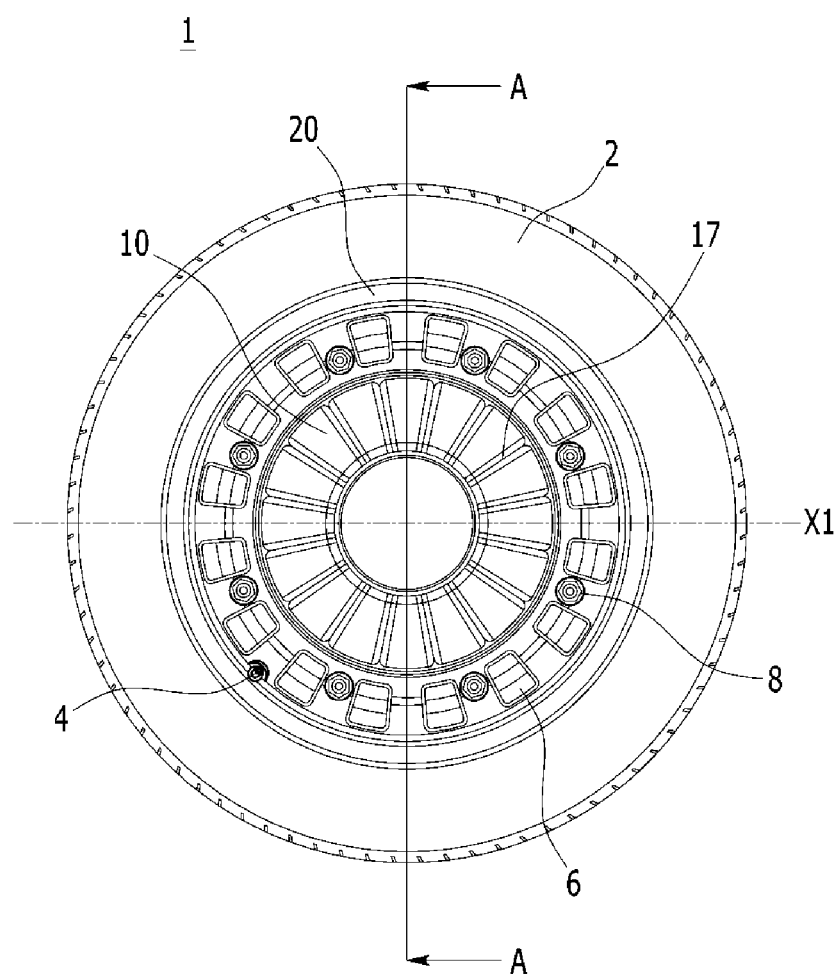
FIG. 1 is a front view of a power transmission device according to an embodiment of the disclosure.

It should be understood that the drawings referenced above are not necessarily drawn to scale, and present a rather simplified representation of various preferred features showing the basic principles of the disclosure. For example, specific design features of the disclosure, including its specific dimension, orientation, position, and shape, are determined in part by the particular intended application and environment of use.

DETAILED DESCRIPTION OF THE EMBODIMENTS

Terms in the specification are used to describe specific embodiments, and are not intended to limit the disclosure. Terms of a singular number used in the specification are intended to include its plural number unless the context clearly indicates otherwise. It is to be understood that terms "comprise," or "include" used in the specification specify the presence of features, numerals, steps, operations, elements and/or components, and do not preclude the presence or addition of one or more other features, numerals, steps, operations, components and/or groups thereof. The term "and/or" used herein includes any one or all combinations of one or more associated listed items. A term "coupled" used herein indicates a physical relationship between two components directly connected to each other, or indirectly connected to each other through one or more medium components.

A "coupling means" or a similar term may indicate a means for coupling at least two members to be rotated together. An example of the coupling means may be a bolt, a nut, welding, press-fitting, an adhesive, a spline, or the like, and is not limited thereto.

An expression "operably connected" or a similar expression may indicate that at least two members are directly or indirectly connected to each other to thus transmit power. However, two members operably connected to each other may not be always rotated at the same speed and in the same direction.

It should be understood that a term used herein such as "a vehicle," "of a vehicle" or another similar term generally refers to a passenger vehicle including a sports utility vehicle (SUV), a bus, a truck, any of various commercial vehicles, a vessel including any of various boats and ships, a truck, an aircraft, or the like, and also refers to a hybrid electric vehicle, an electric vehicle, a plug-in hybrid electric vehicle, a hydrogen powered vehicle, or a vehicle using another alternative fuel (e.g., fuel acquired from a resource other than petroleum). As referenced herein, the electric vehicle (EV) is a vehicle having electric power acquired from a rechargeable energy storage device (e.g., one or more rechargeable electrochemical cells or another type of battery) as a part of its driving force. The electric vehicle (EV) is not limited to an automobile, and may include a motorcycle, a cart, a scooter, or the like. In addition, a hybrid vehicle is a vehicle (e.g., hybrid electric vehicle (HEV)) having two or more power sources, e.g., gasoline-based power and electricity-based power.

Further, it is to be understood that one or more of methods described below or aspects thereof may be executed by at least one or more controllers. The term "controller" may refer to a hardware device including a memory and a processor. The memory may store program instructions, and the processor may be specifically programmed to execute the program instructions to perform one or more processes described below in more detail. The controller may control operations of units, modules, parts, devices, or the like, as described herein. It is also to be understood that the methods described below may be executed by a device including the controller in conjunction with one or more other components, as appreciated by those skilled in the art.

Hereinafter, the disclosure is described in detail with reference to the accompanying drawings.

Figure 2:
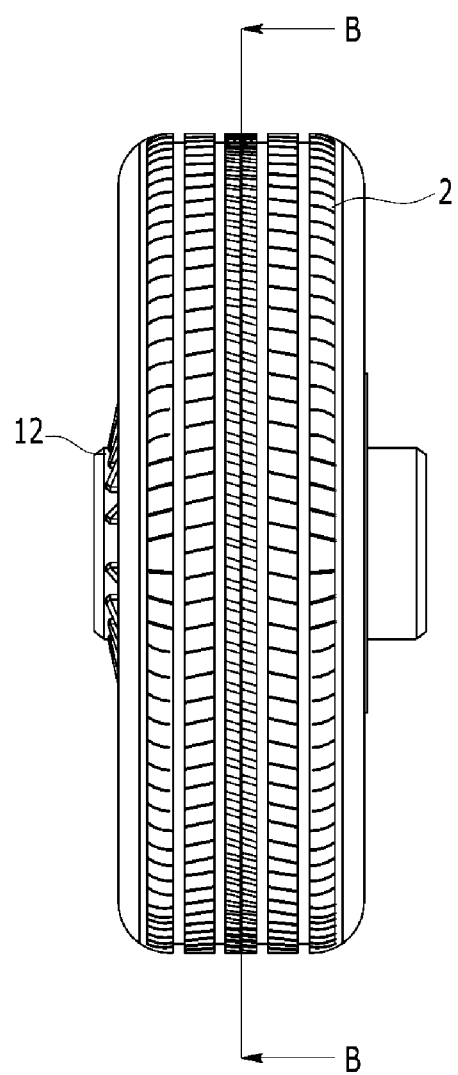
FIG. 2 is a side view of the power transmission device according to an embodiment of the disclosure.
Figure 3:
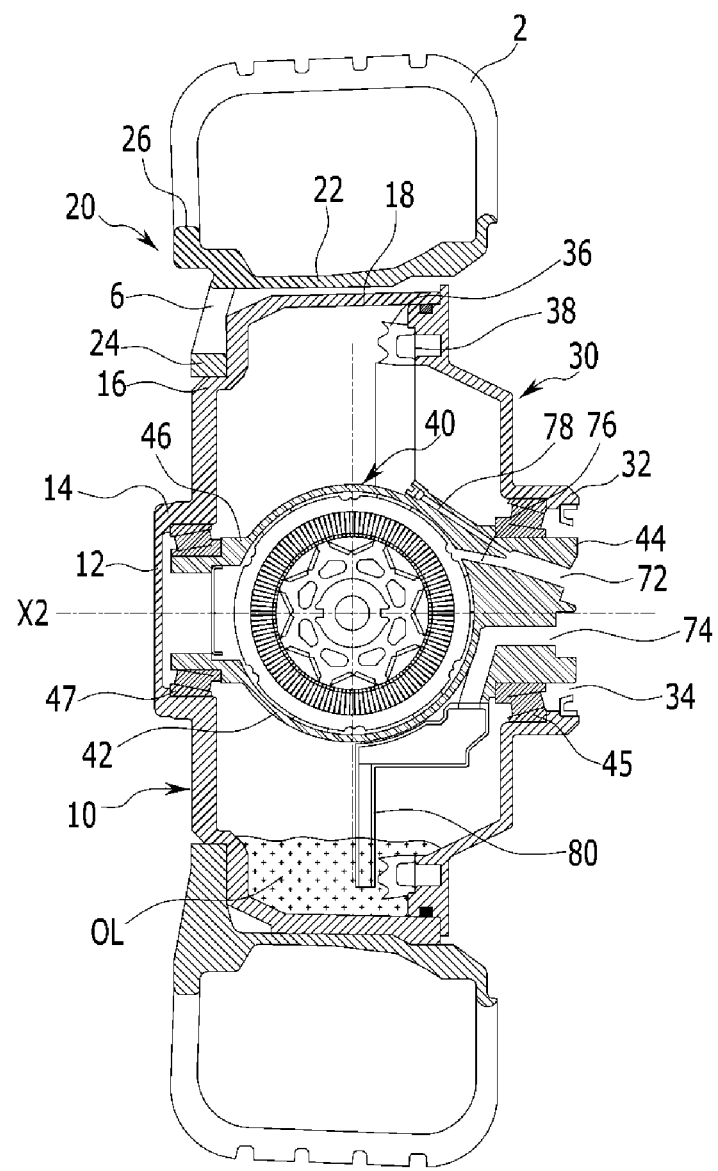
FIG. 3 is a cross-sectional view taken along a line A-A of FIG. 1.
Figure 4:
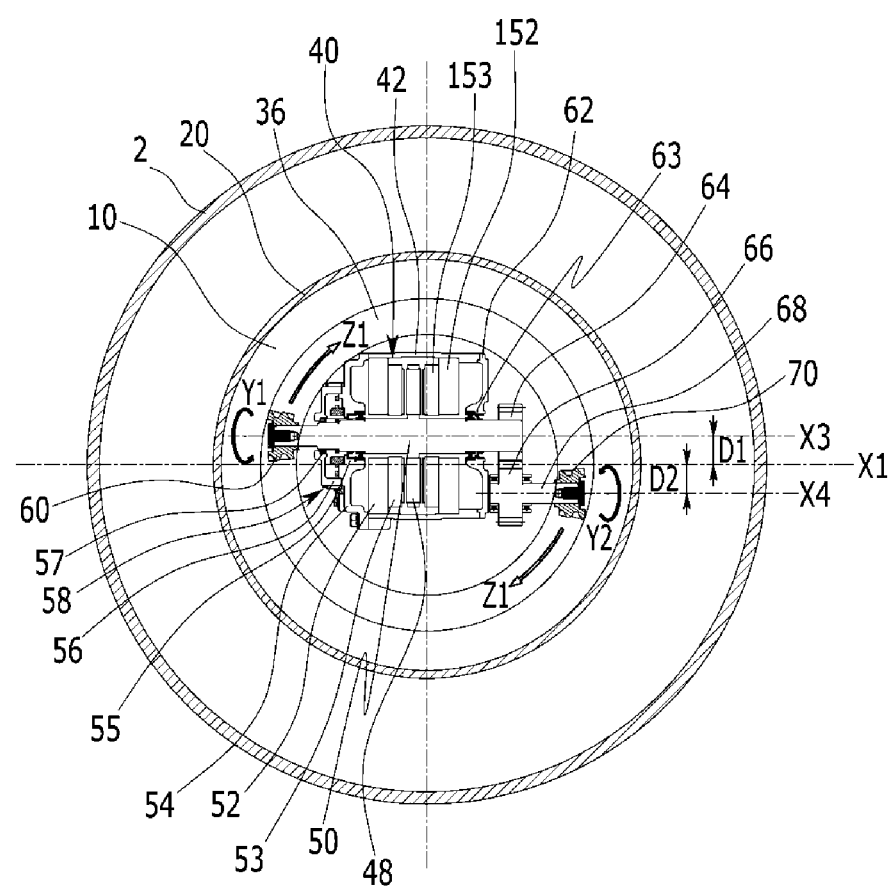
FIG. 4 is a cross-sectional view taken along a line B-B of FIG. 2.
Figure 5:
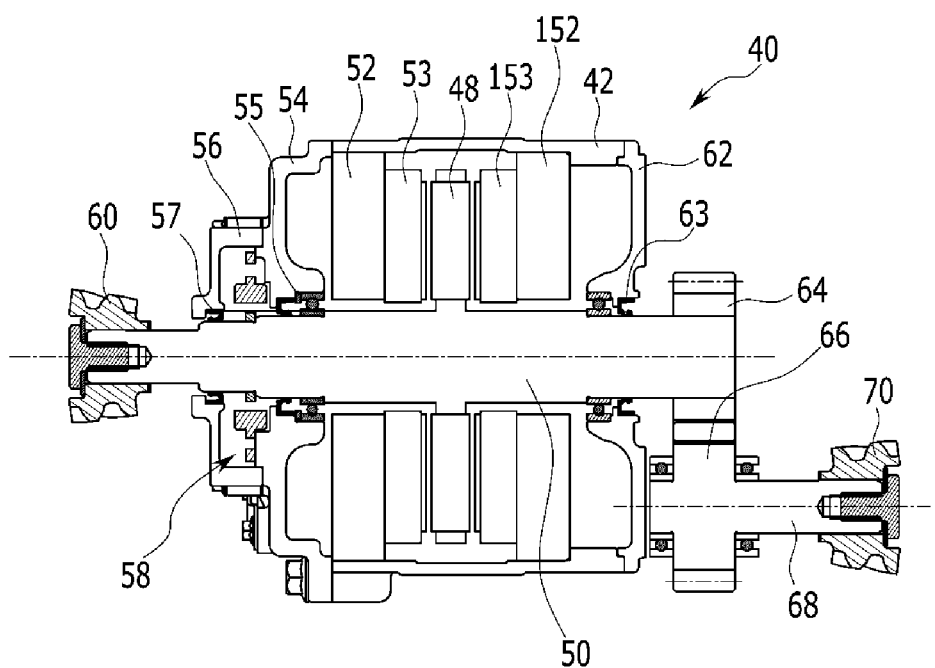
FIG. 5 is a cross-sectional view of a drive motor assembly according to an embodiment of the disclosure.

FIG. 1 is a front view of a power transmission device according to an embodiment of the disclosure; FIG. 2 is a side view of the power transmission device according to an embodiment of the disclosure; FIG. 3 is a cross-sectional view taken along a line A-A of FIG. 1; FIG. 4 is a cross-sectional view taken along a line B-B of FIG. 2; and FIG. 5 is a cross-sectional view of a drive motor assembly according to an embodiment of the disclosure.

As shown in FIGS. 1 to 5, a power transmission device 1 according to an embodiment of the disclosure may be installed in a wheel and function as a wheel drive unit. The power transmission device 1 may include a drum 10, a drum cover 30, a wheel hub 20, and a drive motor assembly 40.

The drum 10 may have a space for installing the drive motor assembly 40, and have a substantially cylindrical shape surrounding the drive motor assembly 40. The drum 10 may include a drum disk portion 12 and a drum cylindrical portion 18.

The drum disk portion 12 may have a substantial disk shape, may be disposed on one surface of the drum 10 in a wheel axial direction X2, and may include first and second step portions 14 and 16. The first step portion 14 may be disposed radially inside the drum 10 than the second step portion 16. That is, the drum disk portion 12 may extend outward from a wheel axis in a radial direction, extend from the first step portion 14 to the other side in the wheel axial direction X2, extend outward again in the radial direction, extend again from the second step portion 16 to the other side in the wheel axial direction X2, and extend outward again in the radial direction. The first step portion 14 may face a bearing support 46 in the radial direction. A bearing 47 may be disposed between the first step portion 14 and the bearing support 46, and the drum 10 may be disposed to be rotatable with respect to the drive motor assembly 40. The drum disk portion 12 may be formed integrally or provided separately with coupling means such as a bolt 8 for its coupling with the wheel hub 20. As shown in FIG. 1, the drum disk portion 12 may have at least one drum rib 17, which extends in the radial direction, between the first step portion 14 and the second step portion 16. The drum rib 17 may not only reinforce rigidity of the drum 10, but also serve as a fin for dissipating heat occurring in the drum 10 to the outside of the drum 10.

The drum cylindrical portion 18 may extend from an outer diameter end of the drum disk portion 12 to the other side in the wheel axial direction X2. Accordingly, the drum 10 may have a space for installing the drive motor assembly 40 therein. The wheel hub 20 may be disposed on an outer peripheral surface of the drum cylindrical portion 18, and the drum cylindrical portion 18 may thus support the wheel hub 20. As shown in FIG. 3, predetermined positions on the outer peripheral surface of the drum cylindrical portion 18 in a circumferential direction may each be spaced apart from an inner peripheral surface of the wheel hub 20, thus providing an air passage formed therebetween and extending in the wheel axial direction X2. The air passage may be communicated with an air inlet 6 of the wheel hub 20, and accordingly, air introduced between the wheel hub 20 and the drum 10 through the air inlet 6 of the wheel hub 20 may pass through the air passage and cool oil in the drum 10.

As shown in FIG. 3, the other surface of the drum 10 in the wheel axial direction may be open, and the drum cover 30 may be coupled to the other surface of the drum 10. The drum cover 30 may have a substantial disk shape, and a drum cover hole 34 may be formed in its center. The outer diameter end of the drum cover 30 may be in contact with the other end of the drum cylindrical portion 18 of the drum 10, and coupled thereto through the coupling means such as the bolt. A sealing member may be disposed between the outer diameter end of the drum cover 30 and the other end of the drum cylindrical portion 18 of the drum 10 to prevent oil in the drum 10 from leaking out of the drum 10.

The drum cover 30 may include a drum cover seat 32. The drum cover seat 32 may extend from an inner end of the drum cover 30 in the radial direction to the other side in the wheel axial direction X2 to form the drum cover hole 34. The drum cover hole 34 may be provided for connecting the drive motor assembly 40 to a vehicle body (or chassis) or a suspension. In more detail, a motor arm 44 of the drive motor assembly 40 may protrude outward from the wheel hub 20 through the drum cover hole 34 to be fixed to the vehicle body (or chassis) or the suspension. A bearing 45 may be disposed between an inner peripheral surface of the drum cover hole 34 and the motor arm 44, and the drum cover 30 may thus be rotated with respect to the drive motor assembly 40.

A ring gear 36 may be disposed on one surface of an outer diameter of the drum cover 30. The ring gear 36 may be manufactured separately from the drum cover 30 and coupled to the drum cover 30 through the coupling means such as the bolt and/or the spline, or may be formed integrally with the drum cover 30. When the ring gear 36 is manufactured separately from the drum cover 30 and coupled to the drum cover 30 through the coupling means, a spacer 38 may be disposed between the drum cover 30 and the ring gear 36. The spacer 38 may adjust a backlash or the like between first and second pinion gears 60 and 70 and the ring gear 36. In one example, the ring gear 36 may be the ring gear of a spiral bevel gear.

The ring gear 36 may be meshed with the first and second pinion gears 60 and 70 in the wheel axial direction X2. Accordingly, the drum cover 30 may receive power from the drive motor assembly 40 to be rotated around the wheel axis, and the drum 10 coupled to the drum cover 30 may also be rotated around the wheel axis by this power. In addition, the bearing 47 may be disposed between the first step portion 14 of the drum 10 and the bearing support 46 of a motor housing 42, the bearing 45 may be disposed between the inner peripheral surface of the drum cover hole 34 and the motor arm 44 of the motor housing 42. Therefore, the motor housing 42 may be fixed to the chassis, the vehicle body, or the suspension, while the drum 10 and the drum cover 30 may be smoothly rotated.

The number of gear teeth of the ring gear 36 may be greater than the number of gear teeth of each of the first and second pinion gears 60 and 70. Therefore, the vehicle may have a reduced rotation speed in a process of transmitting power from the drive motor assembly 40 to the drum cover 30. That is, according to an embodiment of the disclosure, the vehicle may acquire a reduction gear ratio required for its launch or high-speed driving through the first and second pinion gears 60 and 70 and the ring gear 36, which are meshed with each other. Therefore, the small and lightweight power transmission device 1 may be implemented using the reduction device with a simple structure.

Each of the first and second pinion gears 60 and 70, or the ring gear 36 may be a bevel gear, the spiral bevel gear, or the like. In this way, the power transmission device 1 according to an embodiment of the disclosure may acquire the necessary reduction gear ratio with only the two pinion gears 60 and 70 and one ring gear 36, thus achieving higher power transmission efficiency compared to a wheel drive system using a planetary gear and a multi-stage reducer. In addition, power of the drive motor assembly 40 may be transmitted to the ring gear 36 through the two pinion gears 60 and 70, thereby reducing stress acting on each of the two pinion gears 60 and 70. Further, the road impact may also be distributed and transmitted to the two pinion gears 60 and 70 through the ring gear 36. Accordingly, each of the two pinion gears 60 and 70 and the ring gear 36 may have improved durability.

The wheel hub 20 may be operably connected to the drum 10 to receive power from the drum 10. The wheel hub 20 may be rotated about the wheel axis to finally output the power. The wheel hub 20 may have a substantially cylindrical shape, and include a shoulder part 22, a coupling part 24, and a tire installation part 26. The shoulder part 22, the coupling part 24, and the tire installation part 26 may be formed integrally with each other.

The shoulder part 22 may extend in the wheel axial direction X2 to form a space where the power transmission device 1 may be disposed. The shoulder part 22 may define an axial width of the wheel hub 20, and at least the drive motor assembly 40, the drum 10, and the drum cover 30 may be mostly disposed in the axial width defined by the shoulder part 22. Accordingly, it is possible to minimize parts disposed outside the axial width of the wheel hub 20, thereby minimizing interference between the power transmission device 1 and the vehicle part. Therefore, the power transmission device 1 may be very easily installed on the vehicle chassis or the vehicle body. A predetermined position of the shoulder part 22 may be spaced apart from the drum cylindrical portion 18 in the circumferential direction, while another position of the shoulder part 22 may be pressed into the drum cylindrical portion 18 of the drum 10.

The coupling part 24 may extend radially inward from one end of the shoulder part 22, and may be pressed into the drum disk portion 12 of the drum 10 or coupled thereto through the coupling means such as the bolt 8. As shown in FIGS. 1 and 3, the plurality of air inlets 6 may be formed at the coupling part 24 in the circumferential direction, and the air inlet 6 may be communicated with the air passage. Therefore, air introduced between the wheel hub 20 and the drum 10 through the air inlet 6 may cool oil in drum 10 while passing through the air passage.

The tire installation part 26 may protrude radially outward from each of two ends of the shoulder part 22 in the wheel axial direction X2. A tire 2 may be installed on tire installation part 26. The tire 2 may be a rubber tire, a urethane wheel, or the like.

An air injection device 4 may be installed at the wheel hub 10 to inject air into the tire 2.

As shown in FIGS. 3 and 5, the drive motor assembly 40 may be connected to a power source (not shown) such as a battery to generate power to drive the vehicle, and may include the motor housing 42, a first axial flow motor 100, and a second axial flow motor 110. Here, the first and second axial flow motors 100 and 110 may be disposed in one motor housing 42 and may each be an electric motor.

The motor housing 42 may have a through cylindrical shape with an open front surface, a side surface, and an open rear surface, and form an installation space for installing the first and second axial flow motors 100 and 110 in such a manner that a front cover 54 is coupled to the open front surface through the coupling means such as the bolt, and a rear cover 62 is coupled to the open rear surface through the coupling means such as the bolt. In one example, the drive motor assembly 40 may be disposed horizontally. That is, a center line X3 of the first axial flow motor 100 that extends in a length direction may be disposed to coincide with or be parallel to a horizontal line X1 horizontal to the ground passing through the center of the wheel.

A front cover hole 55 may be formed in the front cover 54, and a rear cover hole 63 may be formed in the rear cover 62. The motor shaft 50 may extend in the length direction, and pass through the front cover hole 55 and the rear cover hole 63, a first pinion gear 60 may be fixedly disposed at a front end of the motor shaft 50, and a drive gear 64 may be fixedly disposed at a rear end of the motor shaft 50. The bearing and the sealing member may respectively be disposed between the front cover hole 55 and the motor shaft 50, and between the rear cover hole 63 and the motor shaft 50. The bearing may assist a smooth rotation of the motor shaft 50, and the sealing member may prevent oil in the motor housing 42 from leaking out of the motor housing 42.

As shown in FIGS. 3 and 4, the motor housing 42 may include the motor arm 44 and the bearing support 46 each extending from the side surfaces of the motor housing 42 in the wheel axial direction X2. The bearing support 46 may extend from the side surface to one side in the wheel axial direction X2, and the motor arm 44 may extend from the side surface opposite to the bearing support 46 to the other side in the wheel axial direction X2.

The motor arm 44 may have one end integrally formed with the motor housing 42, and the other end extending to the other side in the wheel axial direction X2 to extend out of the wheel hub 20 through the drum cover hole 34. The other end of the motor arm 44 may be fixed to the vehicle body (or chassis) or the suspension, for example, a knuckle, through a flange or the like.

The drive motor assembly 40 may be fixed to the suspension or the vehicle body such as the knuckle through the motor arm 44. In this case, the road impact occurring when the vehicle is driven, or a wheel impact occurring in sudden acceleration or sudden braking may not be directly transmitted to the part in the motor housing 42, such as the first and second axial flow motors 100 and 110, thereby improving the durability of each of the drive motor assembly 40 and the related parts. In addition, the bearing 45 may be disposed between the inner peripheral surface of the drum cover hole 34 and the motor arm 44 to enable the drum cover 30 to be smoothly rotated with respect to the motor arm 44.

The bearing support 46 may have the other end formed integrally with the motor housing 42, and one end extending to one side in the wheel axial direction X2 and extending to the drum disk portion 12. The bearing 47 may be disposed between the first step portion 14 and the bearing support 46 to enable the drum 10 to be smoothly rotated with respect to the bearing support 46.

In addition, when the bearing support 46 and the motor arm 44 are formed on the two sides of the motor housing 42 in the wheel axial direction X2, the bearing support 46 and the motor arm 44 may support the two sides of the drive motor assembly 40 to prevent the road impact or the like from being directly transmitted to the drive motor assembly 40, thereby further improving the durability of the drive motor assembly 40.

As shown in FIGS. 4 and 5, the first axial flow motor 100 may be disposed in a front portion of the motor housing 42 in the length direction, and include a stator 52, a rotor 48, and a motor shaft 50.

The stator 52 may be fixed to the front portion of the motor housing 42 in the motor housing 42. The stator 52 may be connected to the power source (not shown) to form a magnetic field, and include a stator core and a stator coil 53 surrounding the stator core. A structure of the stator 52 is well known to those skilled in the art, and the description thus omits any further detailed description thereof.

The rotor 48 may protrude radially outward from the center of the motor shaft 50 in the axial direction, and a permanent magnet may be attached to or embedded in an outer peripheral surface of the rotor 48. The rotor 48 may be disposed at the rear of the stator 52 in the axial direction while having a predetermined gap with the stator 52, in particular, the stator coil 53. The axial flow motor may refer a motor where the rotor 48 and the stator 52 face each other in the axial direction in this way. The axial flow motor may have reduced weight and volume compared to a motor of the same capacity. Therefore, it is possible to reduce a weight of the power transmission device 1 and a size of the drive motor assembly 40. The rotor 48 may be rotated around the motor shaft 50 together with the motor shaft 50 by the magnetic field generated by the stator 52.

The motor shaft 50 may extend in the length direction (or the axial direction) to pass through the front cover hole 55, and a first pinion gear 60 may be fixedly disposed at the front end of the motor shaft 50 that passes through the front cover hole 55. The bearing and the sealing member may be disposed between the front cover hole 55 and the first motor shaft 50. The bearing may assist a smooth rotation of the motor shaft 50, and the sealing member may prevent oil in the motor housing 42 from leaking out of the motor housing 42.

The rotor 48 may protrude radially outward from a middle portion of the motor shaft 50 in length direction, and the permanent magnet may be attached to or embedded in the outer peripheral surface of the rotor 48. The rotor 48 may be formed integrally with the motor shaft 50 or may be formed separately from the motor shaft 50 and coupled thereto. Accordingly, the motor shaft 50 may be rotated together with the rotor 48 around the center line X3.

As shown in FIGS. 4 and 5, the second axial flow motor 110 may be disposed in a rear portion of the motor housing 42 in the length direction, and include a second stator 152, the rotor 48, and the motor shaft 50.

The second stator 152 may be disposed in the motor housing 42 and fixed to the rear portion of the motor housing 42. The second stator 152 may be connected to the power source (not shown) to thus form the magnetic field, and include a second stator core and a second stator coil 153 surrounding the second stator core. A structure of the second stator 152 is well known to those skilled in the art, and the description thus omits any further detailed description thereof.

As described above, the rotor 48 may protrude radially outward from the center of the motor shaft 50 in the axial direction, and the permanent magnet may be attached to or embedded in the outer peripheral surface of the rotor 48. The rotor 48 may be disposed at the front of the second stator 152 in the axial direction while having a predetermined gap with the second stator coil 153. The rotor 48 may be rotated around the motor shaft 50 together with the motor shaft 50 by the magnetic field generated by the second stator 152. A current supplied to the stator 52 and the second stator 152 may be controlled for the motor shaft 50 to be rotated by the magnetic field reinforced by the magnetic field generated by the stator 52 and the magnetic field generated by the second stator 152.

The motor shaft 50 may extend rearward along its center line in the length direction (or the axial direction) to pass through the rear cover hole 63, and the drive gear 64 may be fixedly disposed at the rear end of the motor shaft 50 that passes through the rear cover hole 63. The bearing and the sealing member may be disposed between the rear cover hole 63 and the motor shaft 50. The bearing may assist the smooth rotation of the motor shaft 50, and the sealing member may prevent oil in the motor housing 42 from leaking out of the motor housing 42.

The drive motor assembly 40 may be provided with a resolver 58 measuring a rotation speed of the motor shaft 50, that is, a rotation speed of the drive motor assembly 40, by generating a change in a physical value (e.g., a change in a magnetic pole or the magnetic field) corresponding to the rotation speed of the motor shaft 50. The resolver 58 may include a resolver rotor attached to the motor shaft 50 and a resolver stator installed on the front cover 54.

A resolver cover 56 may be further installed on a front surface of the front cover 54 to protect the resolver 58. The resolver cover 56 may surround the resolver stator, and may be fixed to the front cover 54 through the coupling means such as the bolt.

A resolver cover hole 57 may be formed in a front center of the resolver cover 56, and the front end of the first motor shaft 50 may pass through the resolver cover hole 57 and extend to the front of the resolver cover hole 57. An inner peripheral surface of the resolver cover hole 57 and an outer peripheral surface of the motor shaft 50 may be spaced apart from each other, and the sealing member may be disposed therebetween to prevent oil from penetrating into a space formed by the resolver cover 56 and the motor shaft 50.

As described above, the front end of the motor shaft 50 may pass through the front cover hole 55 of the front cover 54 to protrude outward from the front cover 54, and the first pinion gear 60 meshed with the ring gear 36 may be disposed at the front end of the motor shaft 50 that protrudes outward from the front cover 54. The first pinion gear 60 may be manufactured separately from the motor shaft 50 to be coupled to the front end of the motor shaft 50 through the coupling means such as the fixing bolt and/or the spline, or may be formed integrally with the motor shaft 50. In one example, the first pinion gear 60 may be formed as the pinion gear of the spiral bevel gear. The rear end of the motor shaft 50 may pass through the rear cover hole 63 of the rear cover 62 to protrude outward from the rear cover 62, and the drive gear 64 may be disposed at the rear end of the motor shaft 50 that protrudes outward from the rear cover 62. The drive gear 64 may be manufactured separately from the motor shaft 50 to be coupled to the rear end of the motor shaft through the coupling means such as the fixing bolt and/or the spline, or may be formed integrally with the motor shaft 50.

The power transmission device 1 may further include a driven shaft 68 disposed in the space in the drum 10. The driven shaft 68 may be disposed to be parallel to the motor shaft 50. A driven gear 66 meshed with the drive gear 64 may be disposed at a front end of the driven shaft 68. The driven gear 66 may be manufactured separately from the driven shaft 68 to be coupled to the front end of the driven shaft 68 through the coupling means such as welding and/or the spline, or may be formed integrally with the driven shaft 68. The second pinion gear 70 meshed with the ring gear 36 may be disposed at a rear end of the driven shaft 68. The second pinion gear 70 may be manufactured separately from the driven shaft 68 to be coupled to the rear end of the driven shaft 68 through the coupling means such as the fixing bolt and/or the spline, or may be formed integrally with the driven shaft 68. In one example, the second pinion gear 70 may be formed as the pinion gear of the spiral bevel gear. In this way, power of the drive motor assembly 40 may be transmitted to the ring gear 36 through the two pinion gears 60 and 70, thereby reducing the stress acting on each of the two pinion gears 60 and 70. Further, the road impact may also be distributed and transmitted to the two pinion gears 60 and 70 through the ring gear 36. Accordingly, each of the two pinion gears 60 and 70 and the ring gear 36 may have the improved durability.

In order to transmit power of the drive motor assembly 40 to the ring gear 36 through the two pinion gears 60 and 70, a gear ratio of the drive gear 64 and the driven gear 66 may be 1:1, and a gear ratio of the first pinion gear 60 and the second pinion gear 70 may also be 1:1.

Meanwhile, the motor shaft 50 and the driven shaft 68 may be disposed to be spaced apart from the horizontal line X1. For example, the center line X3 of the motor shaft 50 may be spaced apart from the horizontal line X1 by a first separation distance D1, and a center line X4 of the driven shaft 68 may be disposed to be opposite to the center line X3 of the motor shaft 50 based on the horizontal line X1, and spaced apart from the horizontal line X1 by a second separation distance D2.

In an embodiment of the disclosure, rotation directions Y1 and Y2 of the first pinion gear 60 and the second pinion gear 70 are required to be opposite to each other when the ring gear 36 is rotated in a rotation direction Z1. In an embodiment of the disclosure, the rotation direction Y2 of the second pinion gear 70 may be opposite to the rotation direction Y1 of the first pinion gear 60 by the coupling between the drive gear 64 fixedly disposed on the motor shaft 50 and the driven gear 66 fixedly disposed on the driven shaft 68.

Hereinafter, in the following embodiments, the rotation directions of the first and second pinion gears 60 and 70 are opposite to each other by various methods.

As shown in FIG. 3, the power transmission device 1 according to an embodiment of the disclosure may further include a cooling device for cooling the drive motor assembly 40. The cooling device of the power transmission device 1 may be connected to an external cooling system (not shown) of the power transmission device 1 to receive oil from the cooling system, and heated oil while cooling the parts in the power transmission device 1 may be discharged to the cooling system. Therefore, oil may be circulated through the external cooling system and the cooling device of the power transmission device 1.

The motor arm 44 of the drive motor assembly 40 may be provided with a supply passage 72 and a discharge passage 74. Oil may be supplied into the drive motor assembly 40 through the supply passage 72, and discharged from the power transmission device 1 through the discharge passage 74. The discharge passage 74 may be connected to a suction motor (not shown), and the suction motor may suck the oil in the drum 10 through the discharge passage 74.

The motor arm 44 may have first and second oil supply holes 76 and 78 formed therein and connected to the supply passage 72. The first oil supply hole 76 may supply oil supplied into the drive motor assembly 40 through the supply passage 72 in the circumferential direction. Oil supplied through the first oil supply hole 76 may cool the stator 52 and the second stator 152.

The second oil supply hole 78 may supply oil supplied into the drive motor assembly 40 through the supply passage 72 to the front end of the drive motor assembly 40. Oil supplied to the front end of the drive motor assembly 40 may be flowed from the front to the rear along the motor shaft 50.

Oil supplied to the drive motor assembly 40 may cool the motor, and then be discharged into the space in the drum 10 through an outlet (not shown) of the motor housing 42.

A suction pipe 80 may be further disposed on a side of the motor housing 42. The suction pipe 80 may have a free end disposed in the drum 10 to be lower than an oil level OL to suck the oil in the drum 10. An oil filter may be installed in the suction pipe 80 to filter out a foreign material in the sucked oil. In addition, the suction pipe 80 may be connected to the suction motor through the discharge passage 74. Accordingly, when the suction motor is operated, oil in the drum 10 may be sucked through the suction pipe 80, and oil may be discharged to the outside of the power transmission device 1 through the discharge passage 74. Oil may be cooled while passing through the external cooling system, and then supplied back into the power transmission device 1 through the supply passage 72. Meanwhile, a magnet may be attached to the suction pipe 80 to catch iron particles in the oil.

Meanwhile, oil temporarily stored in a lower portion of the drum 10 may be rotated together with the drum 10, introduced between the wheel hub 20 and the drum 10 through the air inlet 6 of the wheel hub 20, and cooled by air passing through the air passage.

Figure 6:
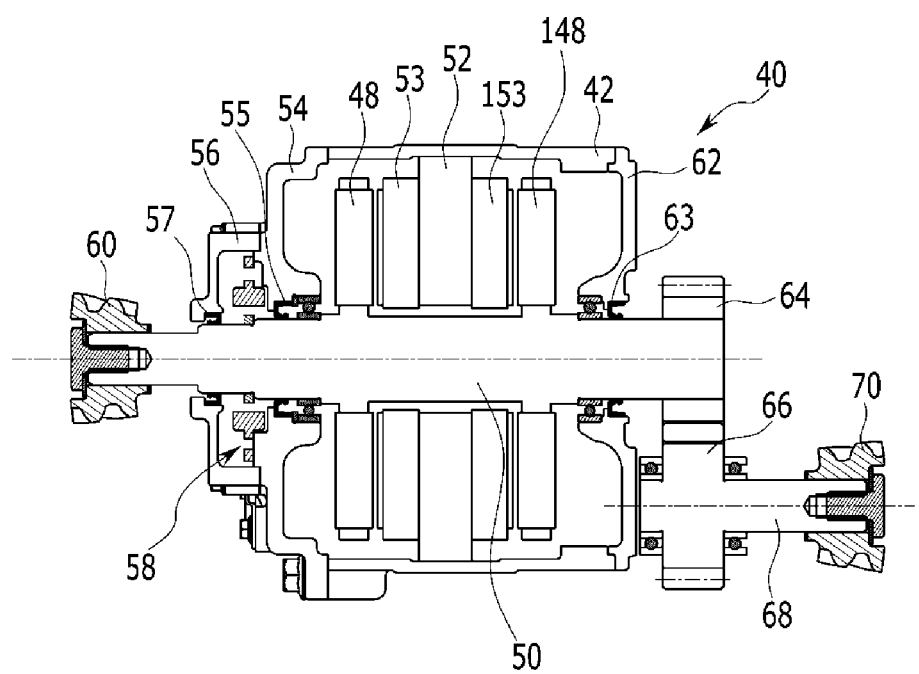
FIG. 6 is a cross-sectional view of a drive motor assembly according to a second embodiment of the disclosure.

FIG. 6 is a cross-sectional view of a drive motor assembly according to a second embodiment of the disclosure. A power transmission device 1 according to a second embodiment of the disclosure is similar to the power transmission device 1 according to an embodiment of the disclosure except for a drive motor assembly 40. Therefore, only a different configuration of the drive motor assembly 40 is described in detail.

As shown in FIG. 6, the drive motor assembly 40 of the power transmission device 1 according to a second embodiment of the disclosure may include the motor housing 42, the first axial flow motor 100, and the second axial flow motor 110.

The motor housing 42 may include the open front surface, the side surface, and the open rear surface, the front cover 54 may be coupled to the open front surface through the coupling means such as the bolt, and the rear cover 62 may be coupled to the open rear surface through the coupling means such as the bolt.

The first axial flow motor 100 may be disposed in the front portion of the motor housing 42 in the length direction, and may include the stator 52, the rotor 48, and the motor shaft 50.

The stator 52 may be fixed to the motor housing 42 to protrude radially inward from the center of the motor housing 42. The stator 52 may be connected to the power source (not shown) to generate the magnetic field, and include the stator core and the stator coil 53 surrounding the stator core. The structure of the stator 52 is well known to those skilled in the art, and the description thus omits any further detailed description thereof.

The rotor 48 may protrude radially outward from a front portion of the motor shaft 50 in the axial direction, and the permanent magnet may be attached to or embedded in the outer peripheral surface of the rotor 48. The rotor 48 may be disposed at the front of the stator 52 in the axial direction while having the predetermined gap with the second stator coil 53. The rotor 48 may be rotated around the motor shaft 50 together with the motor shaft 50 by the magnetic field generated by the stator 52.

The motor shaft 50 may extend forward along the center line X3 in the length direction (or the axial direction) to pass through the front cover hole 55, and the first pinion gear 60 may be fixedly disposed at the front end of the motor shaft 50 that passes through the front cover hole 55.

As shown in FIG. 6, the second axial flow motor 110 may be disposed in the rear portion of the motor housing 42 in the length direction, and include the stator 52, a second rotor 148, and the motor shaft 50.

As described above, the stator 52 may be fixed to the center of the motor housing 42 and include the stator core and the second stator coil 153 surrounding the stator core.

The second rotor 148 may protrude radially outward from a rear portion of the motor shaft 50 in the axial direction, and the permanent magnet may be attached to or embedded in an outer peripheral surface of the second rotor 148. The second rotor 148 may be disposed at the rear of the stator 52 in the axial direction while having a predetermined gap with the second stator coil 153. The second rotor 148 may be rotated around the motor shaft 50 together with the motor shaft 50 by the magnetic field generated by the second stator coil 153. A current supplied to the stator coil 53 and the second stator coil 153 may be controlled for the motor shaft 50 to be rotated by the magnetic field reinforced by the magnetic field generated by the stator coil 53 and the magnetic field generated by the second stator coil 153.

The motor shaft 50 may extend rearward along the center line X3 in the length direction (or the axial direction) to pass through the rear cover hole 63, and the drive gear 64 may be fixedly disposed at the rear end of the motor shaft 50 that passes through the rear cover hole 63.

The power transmission device 1 may further include the driven shaft 68 disposed in the space in the drum 10, and the driven gear 66 meshed with the drive gear 64 may be disposed at the front end of the driven shaft 68. The second pinion gear 70 meshed with the ring gear 36 may be disposed at the rear end of the driven shaft 68. In this way, power of the drive motor assembly 40 may be transmitted to the ring gear 36 through the two pinion gears 60 and 70, thereby reducing the stress acting on each of the two pinion gears 60 and 70. Further, the road impact may also be distributed and transmitted to the two pinion gears 60 and 70 through the ring gear 36. Accordingly, each of the two pinion gears 60 and 70 and the ring gear 36 may have the improved durability.

In order to transmit power of the drive motor assembly 40 to the ring gear 36 through the two pinion gears 60 and 70, a gear ratio of the drive gear 64 and the driven gear 66 may be 1:1, and a gear ratio of the first pinion gear 60 and the second pinion gear 70 may also be 1:1.

Meanwhile, the center line X3 of the motor shaft 50 may be spaced apart from the horizontal line X1 by the first separation distance D1, and the center line X4 of the driven shaft 68 may be disposed to be opposite to the center line X3 of the motor shaft 50 based on the horizontal line X1, and spaced apart from the horizontal line X1 by the second separation distance D2.

Figure 7:
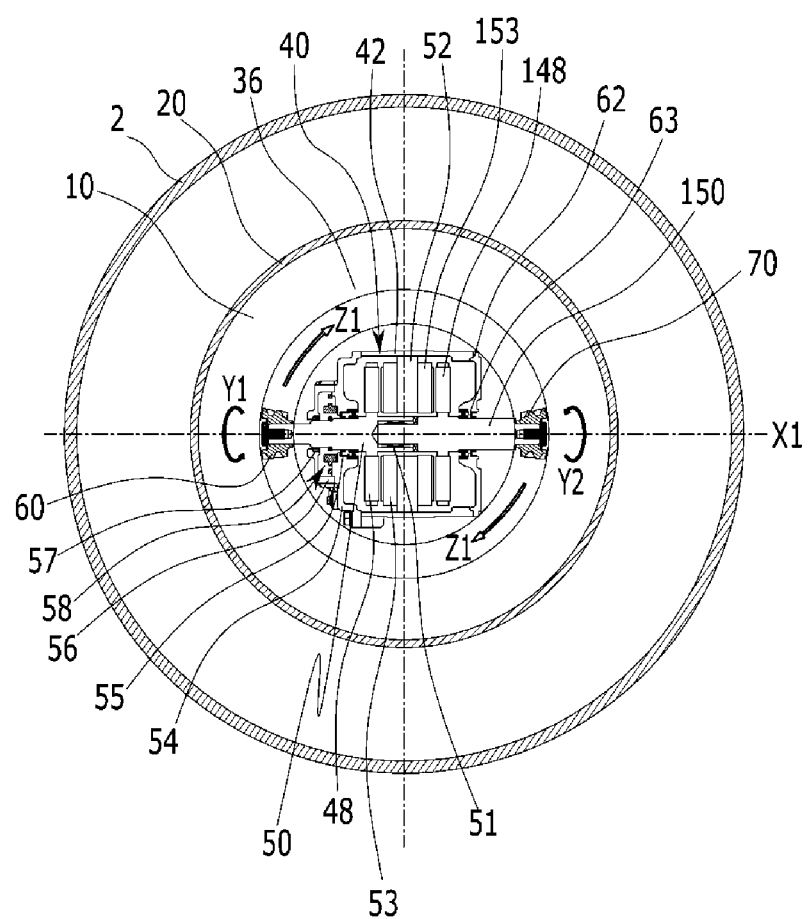
FIG. 7 is a cross-sectional view taken along the line B-B of FIG. 2 in a power transmission device according to a third embodiment of the disclosure.
Figure 8:
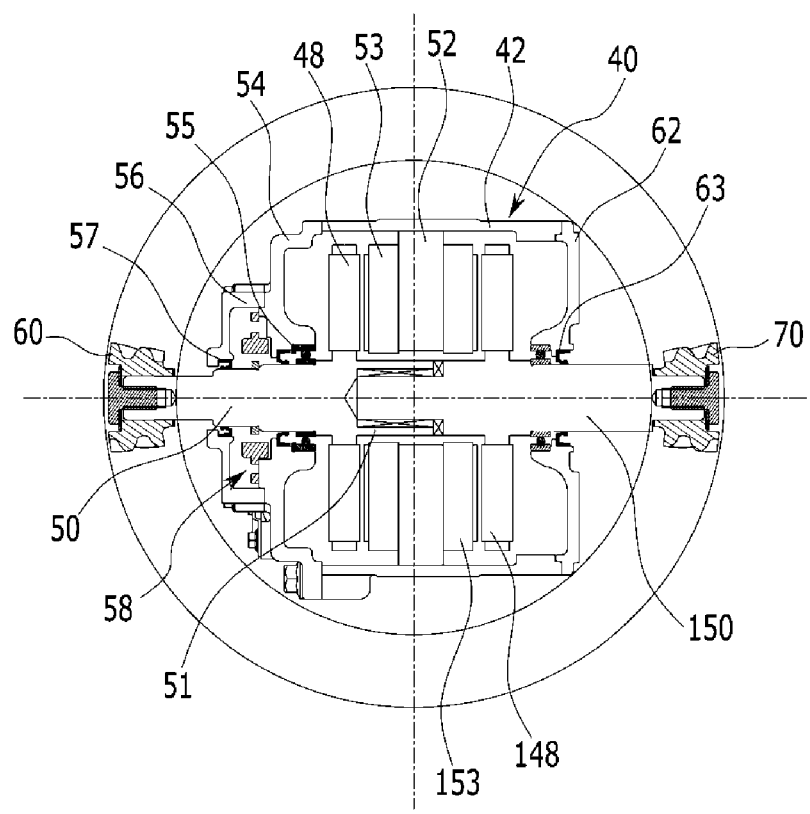
FIG. 8 is a cross-sectional view of a drive motor assembly according to a third embodiment of the disclosure.

FIG. 7 is a cross-sectional view taken along the line B-B of FIG. 2 in a power transmission device according to a third embodiment of the disclosure; and FIG. 8 is a cross-sectional view of a drive motor assembly according to a third embodiment of the disclosure. A power transmission device 1 according to a third embodiment of the disclosure is similar to the power transmission device 1 according to an embodiment of the disclosure except for a drive motor assembly 40. Therefore, only a different configuration of the drive motor assembly 40 is described in detail.

As shown in FIGS. 7 and 8, the drive motor assembly 40 of the power transmission device 1 according to a third embodiment of the disclosure may include the motor housing 42, the first axial flow motor 100, and the second axial flow motor 110.

The motor housing 42 may include the open front surface, the side surface, and the open rear surface, the front cover 54 may be coupled to the open front surface through the coupling means such as the bolt, and the rear cover 62 may be coupled to the open rear surface through the coupling means such as the bolt.

The first axial flow motor 100 may be disposed in the front portion of the motor housing 42 in the length direction, and may include the stator 52, the rotor 48, and the motor shaft 50.

The stator 52 may be fixed to the motor housing 42 to protrude radially inward from the center of the motor housing 42. The stator 52 may be connected to the power source (not shown) to generate the magnetic field, and include the stator core and the stator coil 53 surrounding the stator core.

The rotor 48 may protrude radially outward from the front portion of the motor shaft 50 in the axial direction, and the permanent magnet may be attached to or embedded in the outer peripheral surface of the rotor 48. The rotor 48 may be disposed at the front of the stator 52 in the axial direction while having the predetermined gap with the stator coil 53. The rotor 48 may be rotated around the motor shaft 50 together with the motor shaft 50 by the magnetic field generated by the stator 52 (that is, the stator coil 53).

The motor shaft 50 may extend forward along the center line X3 in the length direction (or the axial direction) to pass through the front cover hole 55, and the first pinion gear 60 may be fixedly disposed at the front end of the motor shaft 50 that passes through the front cover hole 55. A motor shaft hole 51 may be formed in the front of a rear center of the motor shaft 50 in the length direction.

As shown in FIGS. 7 and 8, the second axial flow motor 110 may be disposed in the rear portion of the motor housing 42 in the length direction, and include the stator 52, the second rotor 148, and a second motor shaft 150.

As described above, the stator 52 may be fixed to the center of the motor housing 42 and include the stator core and the second stator coil 153 surrounding the stator core.

The second rotor 148 may protrude radially outward from the rear portion of the motor shaft 50 in the axial direction, and the permanent magnet may be attached to or embedded in the outer peripheral surface of the second rotor 148. The second rotor 148 may be disposed at the rear of the stator 52 in the axial direction while having the predetermined gap with the second stator coil 153. The second rotor 148 may be rotated around the second motor shaft 150 together with the second motor shaft 150 by the magnetic field generated by the second stator coil 153.

The second motor shaft 150 may extend rearward along the center line X3 in the length direction (or the axial direction) to pass through the rear cover hole 63, and the second pinion gear 70 may be fixedly disposed at the rear end of the motor shaft 50 that passes through the rear cover hole 63. A front end of the second motor shaft 150 may extend along the center line X3 in the length direction, and may be inserted into the motor shaft hole 51 formed in the motor shaft 50. The bearing may be disposed between the front end of the second motor shaft 150 and the motor shaft hole 51 to enable smooth relative rotations of the motor shaft 50 and the second motor shaft 150 and alignment of rotation center lines of the motor shaft 50 and the second motor shaft 150.

As described above, the first pinion gear 60 and the second pinion gear 70 are required to have the same rotation speed and the opposite rotation directions when the ring gear 36 is rotated. In a third embodiment of the disclosure, the current supplied to the stator coil 53 and the second stator coil 153 may be controlled for the rotation speed of the motor shaft 50 that is set by the magnetic field generated by the stator coil 53 to be the same as the rotation speed of the second motor shaft 150 that is set by the magnetic field generated by the second stator coil 153, and the rotation direction of the motor shaft 50 that is set by the magnetic field generated by the stator coil 53 to be opposite to the rotation direction of second motor shaft 150 that is set by the magnetic field generated by the second stator coil 153.

Meanwhile, the center line X3 of the motor shaft 50 and the center line X3 of the second motor shaft 150 may coincide with each other, and may also coincide with the horizontal line X1.

Figure 9:
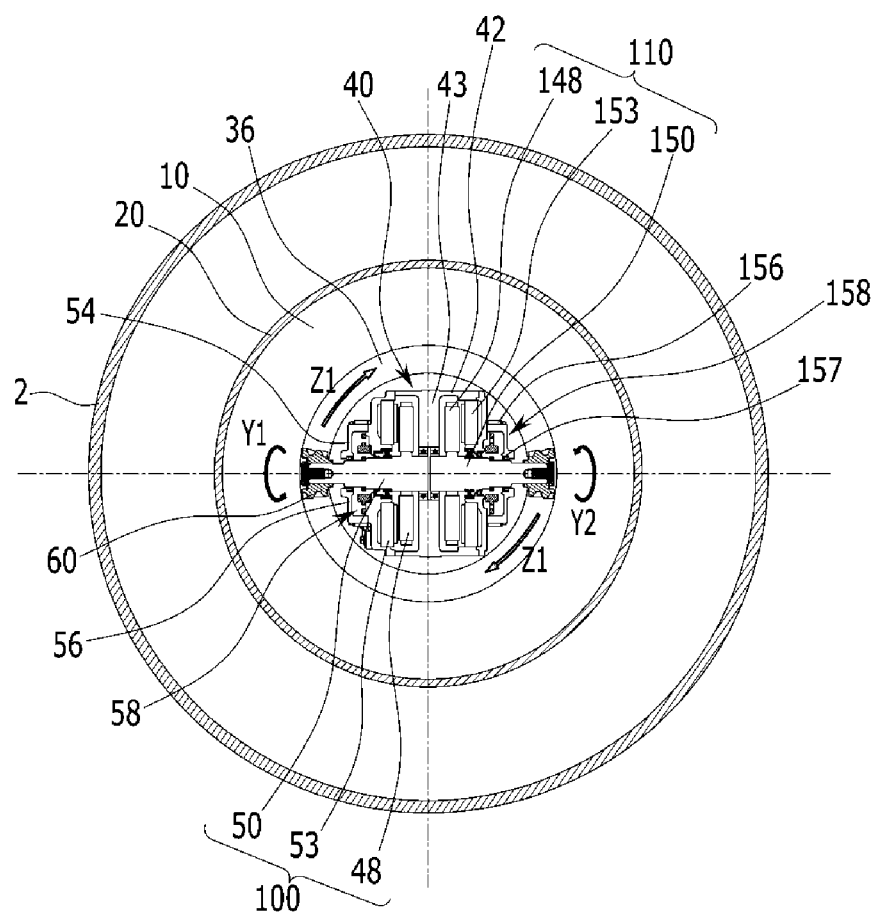
FIG. 9 is a cross-sectional view taken along the line B-B of FIG. 2 in a power transmission device according to a fourth embodiment of the disclosure.
Figure 10:
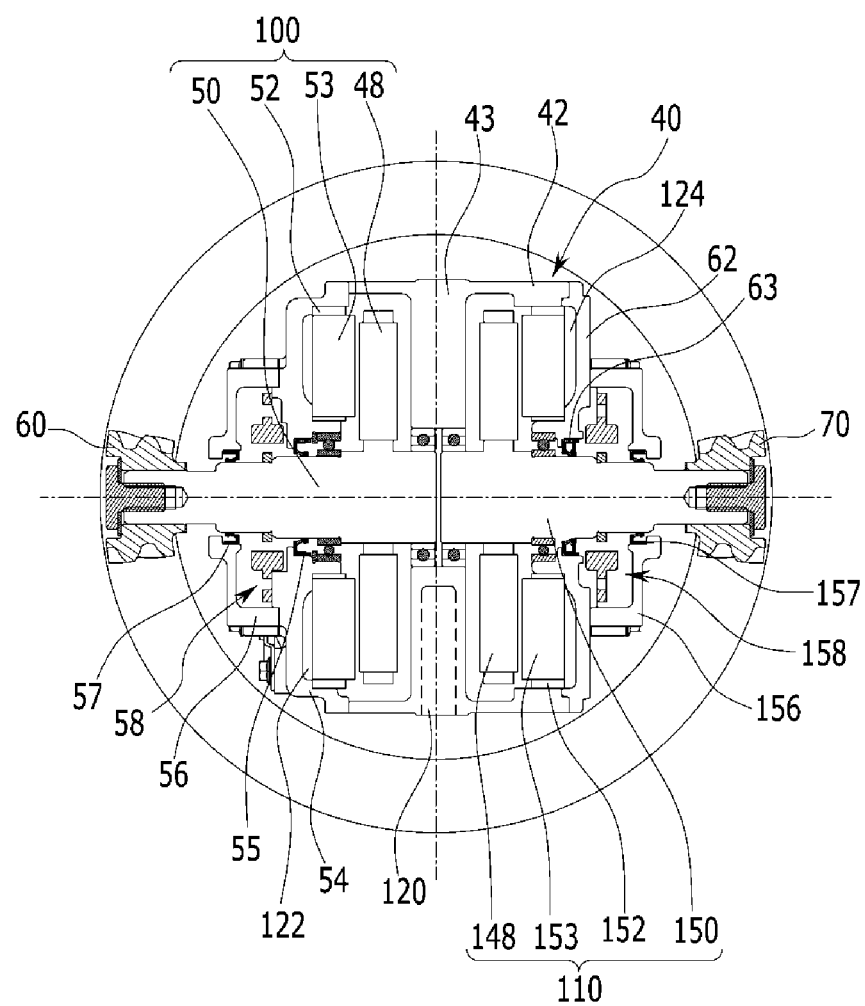
FIG. 10 is a cross-sectional view of a drive motor assembly according to a fourth embodiment of the disclosure.

FIG. 9 is a cross-sectional view taken along the line B-B of FIG. 2 in a power transmission device according to a fourth embodiment of the disclosure; and FIG. 10 is a cross-sectional view of a drive motor assembly according to a fourth embodiment of the disclosure. The power transmission device 1 according to a fourth embodiment of the disclosure is similar to the power transmission device 1 according to an embodiment of the disclosure except for a drive motor assembly 40. Therefore, only a different configuration of the drive motor assembly 40 is described in detail.

As shown in FIGS. 9 and 10, the drive motor assembly 40 of the power transmission device 1 according to a fourth embodiment of the disclosure may include the motor housing 42, the first axial flow motor 100, and the second axial flow motor 110.

The motor housing 42 may include the open front surface, the side surface, and the open rear surface, the front cover 54 may be coupled to the open front surface through the coupling means such as the bolt, and the rear cover 62 may be coupled to the open rear surface through the coupling means such as the bolt. In addition, a center support 43 may protrude radially inward from a middle portion of the motor housing 42 for the space in the motor housing 42 to be divided into the installation space for the first axial flow motor 100 and the installation space for the second axial flow motor 110. A main coolant jacket 120 may be formed at the center support 43, and the main coolant jacket 120 may be communicated with the first oil supply hole 76 to cool inner parts of the first and second axial flow motors 100 and 110, for example, the rotor 48 and the second rotor 148.

The first axial flow motor 100 may be disposed in the front portion of the motor housing 42 in the length direction (for example, the front of the center support 43), and may include the stator 52, the rotor 48, and the motor shaft 50.

The stator 52 may be fixed to the motor housing 42 to protrude radially inward from the front portion of the motor housing 42. The stator 52 may be connected to the power source (not shown) to generate the magnetic field, and include the stator core and the stator coil 53 surrounding the stator core. A first sub-coolant jacket 122 may be formed at the stator 52, and the first sub-coolant jacket 122 may be communicated with the first oil supply hole 76 to cool the stator 52.

The rotor 48 may protrude radially outward from the front portion of the motor shaft 50 in the axial direction, and the permanent magnet may be attached to or embedded in the outer peripheral surface of the rotor 48. The rotor 48 may be disposed at the rear of the stator 52 in the axial direction while having the predetermined gap with the stator coil 53 between the stator 52 and the center support 43. The rotor 48 may be rotated around the motor shaft 50 together with the motor shaft 50 by the magnetic field generated by the stator 52 (that is, the stator coil 53).

The motor shaft 50 may extend forward along the center line X3 in the length direction (or the axial direction) to pass through the front cover hole 55, and the first pinion gear 60 may be fixedly disposed at the front end of the motor shaft 50 that passes through the front cover hole 55. The rear end of the motor shaft 50 may be disposed in the center support 43, and the bearing may be disposed between the rear end of the motor shaft 50 and the center support 43 to assist in the smooth rotation and alignment of the motor shaft 50.

As shown in FIGS. 9 and 10, the second axial flow motor 110 may be disposed in the rear portion of the motor housing 42 in the length direction (for example, the rear of the center support 43), and include the second stator 152, the second rotor 148, and the second motor shaft 150.

The second stator 152 may be fixed to the motor housing 42 to protrude radially inward from the rear portion of the motor housing 42. The second stator 152 may be connected to the power source (not shown) to thus form the magnetic field, and include the second stator core and the second stator coil 153 surrounding the second stator core. A second sub-coolant jacket 124 may be formed at the second stator 152, and the second sub-coolant jacket 124 may be communicated with the first oil supply hole 76 to cool the second stator 152.

The second rotor 148 may protrude radially outward from the rear portion of the motor shaft 50 in the axial direction, and the permanent magnet may be attached to or embedded in the outer peripheral surface of the second rotor 148. The second rotor 148 may be disposed at the front of the second stator 152 in the axial direction while having the predetermined gap with second stator coil 153 between the second stator 152 and the center support 43. The second rotor 148 may be rotated around the second motor shaft 150 together with the second motor shaft 150 by the magnetic field generated by the second stator coil 153.

The second motor shaft 150 may extend rearward along the center line X3 in the length direction (or the axial direction) to pass through the rear cover hole 63, and the second pinion gear 70 may be fixedly disposed at the rear end of the motor shaft 50 that passes through the rear cover hole 63. The front end of the second motor shaft 150 may be disposed in the center support 43, and the bearing may be disposed between a rear end of the second motor shaft 50 and the center support 43 to assist in the smooth rotation and alignment of the second motor shaft 50.

As shown in FIGS. 9 and 10, the drive motor assembly 40 may be provided with a second resolver 158 measuring the rotation speed of the second motor shaft 150 by generating a change in a physical value (e.g., the change in the magnetic pole or the magnetic field) corresponding to the rotation speed of the motor shaft 150. The second resolver 158 may include a second resolver rotor attached to the second motor shaft 150 and a second resolver stator installed on the rear cover 62.

A second resolver cover 156 may be further installed on a rear surface of the rear cover 62 to protect the rear resolver 158. The second resolver cover 156 may surround the second resolver stator, and may be fixed to the rear cover 62 through the coupling means such as the bolt.

A second resolver cover hole 157 may be formed in a rear center of the second resolver cover 156, and a rear end of the second motor shaft 150 may pass through the second resolver cover hole 157 to extend rearward. An inner peripheral surface of the second resolver cover hole 157 and an outer peripheral surface of the second motor shaft 150 may be spaced apart from each other, and the sealing member may be disposed therebetween to prevent oil from penetrating into a space formed by the second resolver cover 156 and the second motor shaft 150.

As described above, the first pinion gear 60 and the second pinion gear 70 are required to have the same rotation speed and the opposite rotation directions when the ring gear 36 is rotated. In a fourth embodiment of the disclosure, the current supplied to the stator coil 53 and the second stator coil 153 may be controlled for the rotation speed of the motor shaft 50 that is set by the magnetic field generated by the stator coil 53 to be the same as the rotation speed of the second motor shaft 150 that is set by the magnetic field generated by the second stator coil 153, and the rotation direction of the motor shaft 50 that is set by the magnetic field generated by the stator coil 53 to be opposite to the rotation direction of the second motor shaft 150 that is set by the magnetic field generated by the second stator coil 153.

Meanwhile, the center line X3 of the motor shaft 50 and the center line X3 of the second motor shaft 150 may coincide with each other, and may also coincide with the horizontal line X1.

Although the embodiments of the disclosure have been described hereinabove, the scope of the disclosure is not limited thereto, and all equivalent modifications easily modified by those skilled in the art to which the disclosure pertains are intended to fall within the scope and spirit of the disclosure.

What is claimed is:
1. A power transmission device comprising:
   a drive motor assembly including a motor housing, a first axial flow motor disposed in a front portion of the motor housing and rotating a first pinion gear in a first rotation direction, and a second axial flow motor disposed in a rear portion of the motor housing and operably coupled to a second pinion gear to rotate the second pinion gear in a second rotation direction opposite to the first rotation direction;
   a drum surrounding the drive motor assembly and including a drum disk portion disposed on one surface in a wheel axial direction and a cylindrical portion extending from an outer diameter end of the drum disk portion in the wheel axial direction;
   a drum cover coupled to the other surface of the drum in the wheel axial direction, and having a ring gear provided on an outer diameter of the drum cover and meshed with the first and second pinion gears; and
   a wheel hub installed with a tire, and coupled to the drum to be rotated together with the drum,
   wherein the first and second pinion gears are rotated at the same speed.
2. The device of claim 1, wherein the first axial flow motor includes:
   a stator fixed to the front portion of the motor housing and generating a magnetic field;

a motor shaft extending along a center line in the axial direction and disposed in the motor housing to be rotatable around the center line; and a rotor protruding radially outward from an axial center portion of the motor shaft, disposed at the rear of the stator in the axial direction while having a predetermined gap with the stator to face the stator in the axial direction, and rotated in the first rotation direction by the magnetic field generated by the stator, and wherein the first pinion gear is disposed at a front end of the motor shaft that protrudes forward from the motor housing.

3. The device of claim 2, wherein the second axial flow motor includes:

a second stator fixed to the rear portion of the motor housing and generating a magnetic field;

the motor shaft; and the rotor, wherein the second stator is disposed at the rear of the rotor in the axial direction while having a predetermined gap with the rotor to face the rotor in the axial direction, the second stator is configured to rotate the rotor in the first rotation direction by the magnetic field generated by the second stator, and wherein a drive gear is fixedly disposed at a rear end of the motor shaft that protrudes rearward from the motor housing.

4. The device of claim 3, wherein the drive motor assembly further includes:

a driven shaft disposed in parallel with the motor shaft; and a driven gear disposed in a front portion of the driven shaft and meshed with the drive gear, and wherein the second pinion gear is fixedly disposed at a rear end of the driven shaft.

5. The device of claim 1, wherein the first axial flow motor includes:

a stator fixed to a center portion of the motor housing in the axial direction and generating a magnetic field;

a motor shaft extending along a center line in the axial direction, and disposed in the motor housing to be rotatable around the center line; and a rotor protruding radially outward from an axial front portion of the motor shaft, disposed at the front of the stator in the axial direction while having a predetermined gap with the stator to face the stator in the axial direction, and rotated in the first rotation direction by the magnetic field generated by the stator, and wherein the first pinion gear is disposed at a front end of the motor shaft that protrudes forward from the motor housing.

6. The device of claim 5, wherein the second axial flow motor includes:

the stator;

the motor shaft; and a second rotor protruding radially outward from an axial rear portion of the motor shaft, disposed at the rear of the stator in the axial direction while having a predetermined gap with the stator to face the stator in the axial direction, and rotated in the first rotation direction by the magnetic field generated by the stator, and wherein a drive gear is fixedly disposed at a rear end of the motor shaft that protrudes rearward from the motor housing.

7. The device of claim 6, wherein the drive motor assembly further includes:

a driven shaft disposed in parallel with the motor shaft; and a driven gear disposed in a front portion of the driven shaft and meshed with the drive gear, and wherein the second pinion gear is fixedly disposed at a rear end of the driven shaft.

8. The device of claim 5, wherein a motor shaft hole is formed in the front of a rear center of the motor shaft in the axial direction.

9. The device of claim 8, wherein the second axial flow motor includes:

the stator;

a second motor shaft extending along the center line in the axial direction, including a front end portion extending forward in the axial direction to be rotatably inserted into the motor shaft hole, and disposed in the motor housing to be rotatable around the center line; and a second rotor protruding radially outward from the second motor shaft, disposed at the rear of the stator in the axial direction while having a predetermined gap with the stator to face the stator in the axial direction, and rotated in the second rotation direction by the magnetic field generated by the stator, and wherein the second pinion gear is fixedly disposed at a rear end of the second motor shaft that protrudes rearward from the motor housing.

10. The device of claim 1, wherein the motor housing further includes a center support protruding radially inward from a middle portion of the motor housing, and the first axial flow motor is disposed at the front of the center support, and the second axial flow motor is disposed at the rear of the center support.

11. The device of claim 10, wherein the first axial flow motor includes:

a stator fixed to the front portion of the motor housing and generating a magnetic field;

a motor shaft extending along a center line in the axial direction, and disposed in the motor housing to be rotatable around the center line; and a rotor protruding radially outward from the motor shaft, disposed at the rear of the stator in the axial direction while having a predetermined gap with the stator to face the stator in the axial direction, and rotated in the first rotation direction by the magnetic field generated by the stator, and wherein the first pinion gear is disposed at a front end of the motor shaft that protrudes forward from the motor housing, and a rear end of the motor shaft is rotatably supported by the center support.

12. The device of claim 11, wherein the second axial flow motor includes:

a second stator fixed to the rear portion of the motor housing and generating a magnetic field;

a second motor shaft extending along the center line in the axial direction, and disposed in the motor housing to be rotatable around the center line; and a second rotor protruding radially outward from the second motor shaft, disposed at the front of the second stator in the axial direction while having a predetermined gap with the second stator to face the second stator in the axial direction, and rotated in the second rotation direction by the magnetic field generated by the second stator, and wherein the second pinion gear is disposed at a rear end of the second motor shaft that protrudes rearward from the motor housing, and a front end of the second motor shaft is rotatably supported by the center support.

13. The device of claim 12, wherein a main coolant jacket is formed at the center support to cool the rotor and the second rotor, a first sub-coolant jacket is formed at the stator to cool the stator, and a second sub-coolant jacket is formed at the second stator to cool the second stator.

* * * * *